Oct. 3, 1967 P. J. LUPOLI 3,345,554
REGULATING SYSTEM WITH PERIODICALLY INHIBITED
FOLD-BACK CHARACTERISTIC
Filed Aug. 28, 1964 2 Sheets-Sheet 1

INVENTOR
PETER J. LUPOLI
BY
James and Franklin
ATTORNEYS

INVENTOR
PETER J. LUPOLI
BY
ATTORNEYS 3,345,554
REGULATING SYSTEM WITH PERIODICALLY
INHIBITED FOLD-BACK CHARACTERISTIC
Peter J. Lupoli, Hamden, Conn., assignor to Technipower Incorporated, South Norwalk, Conn., a corporation of Connecticut
Filed Aug. 28, 1964, Ser. No. 392,773
7 Claims. (Cl. 323—4)

ABSTRACT OF THE DISCLOSURE

A power supply regulating system providing for voltage regulation and current limiting under normal conditions of operation and providing a fold-back action for extreme overload conditions, the system further comprising means for producing a series of signals separated by intervening periods of non-signal which are electrically connected to the limiting and fold-back portions of the system, the signals when present being effective to render the fold-back means at least partially inoperative but not substantially affecting the operation of the current limiting means, the relative time durations of the signal and non-signal conditions being such as to permit the regulating system to become effective after fold-back has occurred even when connected to an opposing voltage.

---

The present invention relates to a regulating system, specially adapted for use in conjunction with a power supply, which system has a fold-back characteristic which is periodically inhibited, thereby to permit the regulating system to become effective even when connected to an opposing voltage.

Power supplies are customarily provided with regulating systems so that the voltage or current, and preferably both, will be maintained at a predetermined value. It is extremely desirable that such power supplies provide a substantially constant current throughout the normal range of variations in load to which the power supply is connected. It is further desirable that if the power supply is highly overloaded (a short circuit represents the extreme of this condition) the current delivered by the power supply be substantially reduced. This is termed "fold-back."

Although fold-back is a desirable characteristic in a power supply, the existence of that characteristic presents problems, particularly when a plurality of power supplies are connected in series. In such a circuit arrangement it is extremely unlikely that both power supplies, when they are turned on, will come up to full strength at precisely the same instant, yet if they do not the earlier-to-mature power supply, the one which first comes up to strength, will apply a reverse voltage to the second power supply. This will act upon that second power supply in the same fashion as a short circuit connected thereacross, that is to say, it will act as a strong overload, and if the second power supply has a fold-back characteristic that characteristic will take control, and the second power supply will therefore only deliver its folded-back current output, which is considerably lower than its predetermined rated output. This problem has been met in the past only by providing complicated circuitry, usually involving the use of delay relays, which added appreciably to the cost of such power supplies and rendered them much more susceptible to breakdown and maintenance problems.

The prime object of the present invention is to devise a regulating system well adapted for use with a power supply which exhibits a fold-back characteristic of appreciable magnitude (which provides a significant reduction of current output under overload conditions), yet which can be used in series connection with other sources of power and will not be sensitive to the order in which the power supplies come up to strength, and to do so by means of circuitry considerably less complicated and expensive than that which has heretofore been used for that purpose.

In accordance with the present invention that portion of the regulation system which produces the fold-back characteristic is periodically inhibited or rendered wholly or partially ineffective by means of a series of time-separated signals applied thereto, those signals being operative for periods of time sufficient to permit the regulating system, when it is turned on, to come up to operating strength. The periods of time between these disabling signals is sufficiently large so as to permit the fold-back characteristics of the power supply to be effective when the power supply is subjected to overload conditions after it has come up to strength.

In the circuitry here specifically disclosed, which represents a preferred embodiment of the present invention, the regulating system is provided with a current-passing transistor which effects the primary regulating function thereof. Another transistor, which produces the fold-back characteristic and which will hereinafter be termed the "fold-back transistor," is connected to the passing transistor in such a manner as to reduce the current flowing through the passing transistor when the fold-back transistor is appropriately biased. Means are provided for applying that appropriate bias to the fold-back transistor when the regulating system is connected to an external system producing an overload condition, thereby to produce the fold-back characteristic. A series of signal pulses are produced, and those pulses are applied to the fold-back transistor in a sense opposite to the aforementioned biasing means, those signals being effective to overcome that biasing means and thus render the fold-back transistor ineffective, wholly or partially, when said signals are applied thereto. The on-off time cycle of these signals is such as to permit the regulating system to be turned on and come up to strength during the time that said signals are applied to the fold-back transistor so as to render it wholly or partially ineffective. Consequently, if that regulating system is connected in series with another source of power which is already effective, the power supply of which that system is a part will be permitted to come up to strength and take control despite its inherent fold-back characteristic. Once that power supply has come up to strength, the other power supply to which it is connected will no longer act as an overload thereacross, and normal operation will ensue. When the two power supplies are operating under conditions within the normal load range, they will function in normal fashion and the fold-back characteristic will be unused. If thereafter an overload condition should occur, the time interval between the application of the fold-back disabling signal pulses and the magnitude of those pulses are chosen to be such that the fold-back effect during the periods when said signal is not applied is sufficiently greater than the non-fold-back effect when the signal is applied as to produce a highly satisfactory overall resultant fold-back.

To the accomplishment of the above, and to such other objects as may hereinafter appear, the present invention relates to the construction and arrangement of a regulating system having a fold-back characteristic, as defined in the appended claims, and as described in this specification, taken together with the accompanying drawings, in which:

Figure 1:
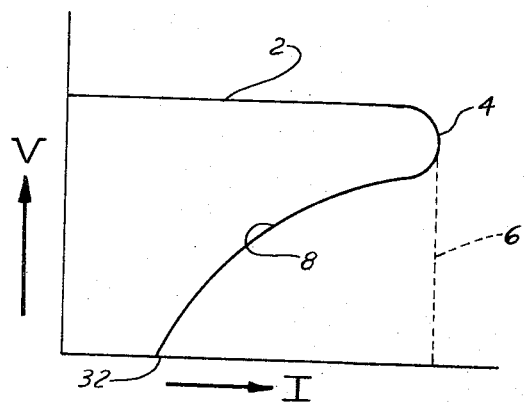
FIG. 1 is a graphical representation of the voltage and current relationships when a fold-back characteristic is present.

The graph of FIG. 1 represents a plot of voltage against current for a typical regulated power supply having a fold-back characteristic. Such a power supply will, over a normal range of load condition, maintain substantially uniform voltage output while the current varies in accordance with the load conditions. This is indicated by the portion 2 of the graph of FIG. 1. As the load increases, and the current passed by the regulated system correspondingly increases, a point 4 will be reached representing the maximum amount of current which the regulating system will pass. As indicated by the broken line 6, if the regulating system is one having merely a current limiting feature, and not a fold-back feature, the current will thereafter remain constant. However, with a fold-back feature, as indicated by the solid line portion 8 of the curve, increase in the load will give rise to an actual decrease in the current passed by the regulating system, that system thereby protecting itself against overload by actually dissipating less power during an overload or short circuit condition than at full rated load.

Figure 2:
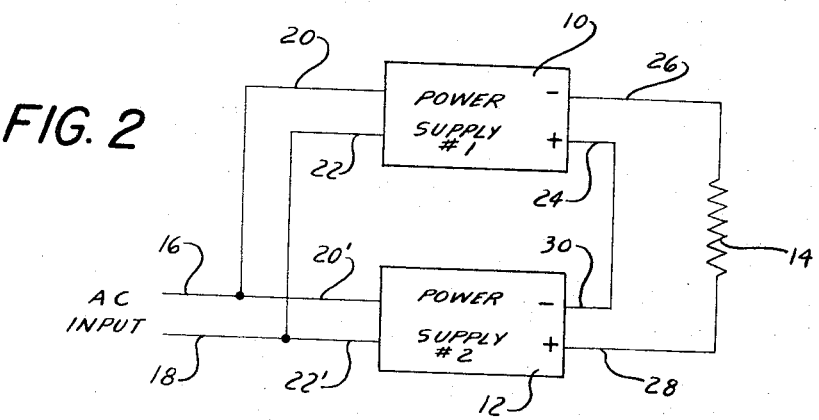
FIG. 2 is a block-type circuit diagram illustrating a pair of regulated power supplies connected in series with a load.

FIG. 2 illustrates the circuit connection of two regulated DC power supplies 10 and 12 in series with one another and with a load 14. Leads 16 and 18 extend to a source of AC power, leads 20 and 22 connecting the input of the first power supply 10 with leads 16 and 18 respectively and leads 20' and 22' connecting the input of the second power supply 12 to that AC input. Power supply 10 has positive and negative output leads 24 and 26 respectively, and power supply 12 has positive and negative leads 28 and 30 respectively, the leads 24 and 30 being connected together and the leads 26 and 28 being connected together with the load 14 interposed therebetween, the power supplies 10 and 12 therefore being connected in series. If power supply 10 is turned on and becomes effective even momentarily before power supply 12, the voltage output from power supply 10 will be applied across the terminals 28 and 30 of power supply 12 and will oppose the normal output polarity of those terminals 28, 30. The power supply 12 will "see" this as a short circuit across its output terminals 28, 30, and if the power supply 12 has a fold-back characteristic, such as that shown in FIG. 1, its current output will "lock out" at folded-back point 32, and the output of power supply 12 will never come up to rated value.

Figure 3:
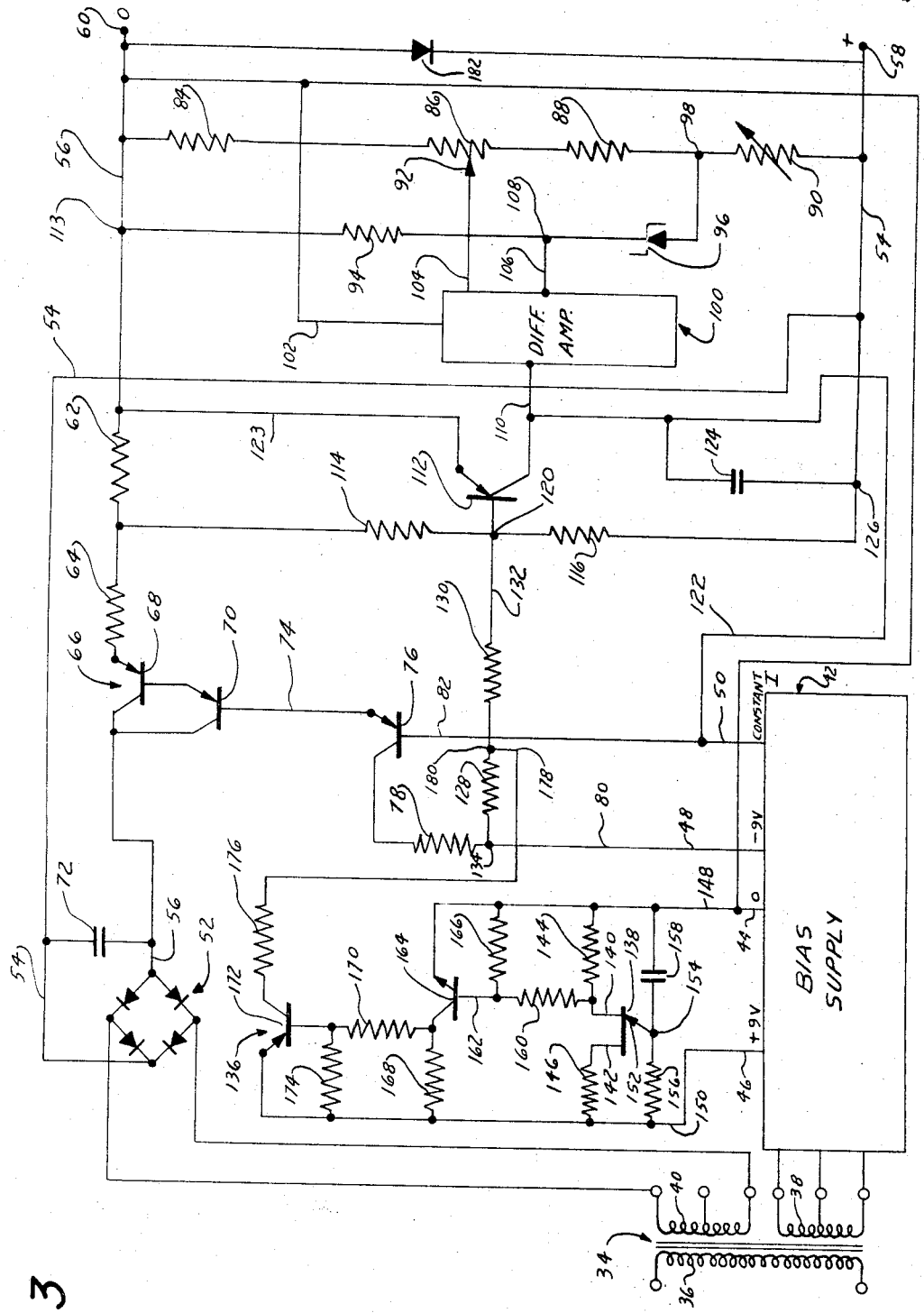
FIG. 3 is a circuit diagram of a preferred embodiment of the power supply of the present invention.

It is to prevent this "lock out" condition in a power supply provided with a regulating system having a fold-back characteristic, and to do so in a simple and effective manner and without substantial impairment of the benefits derived from the fold-back characteristic, that the system of the present invention has been devised. FIG. 3 illustrates a preferred embodiment thereof, involving the use of transistorized circuitry.

Much of the circuitry involved has been known, and gives rise to a regulated power supply having a known fold-back characteristic. This much of the circuitry will be first described.

A transformer generally designated 34 has an input winding 36 connected to a source of AC power, and has a pair of secondary windings 38 and 40. The secondary winding 38 is connected to a bias supply generally designated 42, the internal circuit arrangement of which forms no part of the present invention and may take any of a number of known forms. The bias supply 42 is provided with outputs 44, 46, 48 and 50. The output 44 is at reference or common potential, the output 46 is at a positive potential relative to output 44, the output 48 is at a negative potential relative to output 44, and the output 50 constitutes a source of constant current.

The secondary winding 40 is connected to a full wave rectifier generally designated 52 and the output of which is connected to positive lead 54 and common or reference lead 56. The positive lead 54 is connected to positive output terminal 58. The reference potential lead 56 is connected to reference potential output terminal 60 via resistor 62, resistor 64 and the collector and emitter of passing transistor generally designated 66. In the form here specifically disclosed the passing transistor 66 actually comprises transistors 68 and 70 connected together in the so-called Darlington connection for greater amplification and controlled by transistor 76. The base of the transistor 70 is connected via lead 74 to the emitter of transistor 76. The collector of that transistor is connected via resistor 78 and lead 80 to the bias supply negative output 48. The base of transistor 76 is connected via lead 82 to the constant current output 50 of the bias supply 42. A smoothing capacitor 72 may be connected across the leads 54 and 56.

Connected across the output leads 54 and 56 are resistors 84, 86, 88 and 90, the latter being adjustable, and the resistor 86 being provided with a slidable contactor 92. Resistor 94 and Zener diode 96 are connected in series between the leads 56 and the point 98 between resistors 88 and 90. A differential amplifier generally designated 100 is provided, that amplifier 100 having a reference voltage input 102, an input 104 connected to the slidable contactor 92, and an input 106 connected to point 108 located between resistor 94 and Zener diode 96. The output from the differential amplifier, at lead 110, represents an amplified version of the difference in potential between inputs 104 and 106. It is connected to the collector of a fold-back transistor 112, the emitter thereof being connected to reference potential lead 56 at a point 113 thereon after the resistor 62. Resistors 114 and 116 are connected in series between the leads 56 and 54, in advance of resistor 62, and the base of transistor 112 is connected to point 120 located between resistors 114 and 116. Lead 122 connects the constant current bias output 50 with the collector of transistor 112, and lead 123 connects the emitter of transistor 112 to reference lead 56. Capacitor 124 may be connected between lead 122 and point 126 located after resistor 116 in order to impart stability to the system by lowering the frequency response of the closed loop system and preventing oscillation thereof. Resistors 128 and 130 and lead 132 connect point 120 with point 134 located at the lower end of resistor 78.

In the circuitry as thus far described the rectified DC output of the bridge 52, smoothed by capacitor 72, is applied across the output terminals 58 and 60. The current output flows through the emitter-collector circuit of passing transistor 66 and through resistors 64 and 62. The collector-emitter circuit of transistor 112 is connected in shunt with the base-emitter circuit of the passing transistor complex 66.

Voltage regulation is achieved as follows: The differential amplifier 100 senses variations in the voltage at the slidable contactor 92 associated with the resistor 86 and compares that voltage with a reference voltage derived in part from the Zener diode 96. As the voltage output of the system increases the voltage output 110 of the differential amplifier 100 will increase, and this rise in potential will be applied, through leads 122 and 82, to the base of the transistor 76 forming a part of the pasing transistor complex 66, causing that complex to have a greater voltage drop therein for the system output, thereby returning the output voltage to its predetermined value. The regulated predetermined voltage value is determined by the setting of the slidable contactor 92 along the resistor 86.

Current limiting is produced by the action of resistor 62 and the resistors 114 and 116, which collectively provide bias for the base of transistor 112. As the current output of the power supply increases, the current through resistor 62 increases, the bias applied to the base of transistor 112 increases, and this causes an increase in the collector-emitter current of that transistor. Since the collector-emitter circuit of transistor 112 is connected in shunt with the base-emitter circuit of the pasing transistor complex 66, this increase in collector-emitter current of the transistor 112 will result in a decrease in the base-emitter current of the passing transistor complex 66, thereby limiting the amount of current which passes through the collector-emitter circuit thereof, thereby limiting the current output of the current supply. Once the current through the resistor 62 reaches a predetermined maximum value, the base bias of the transistor 112 produced thereby takes control away from the differential amplifier 100, and increases in output current act through the base of transistor 112 to correspondingly decrease the current passed by transistor 66.

Fold-back is achieved as follows: In a high overload condition, such as a short circuit, the voltage across the output terminals 58 and 60, and hence across the leads 54 and 56 will drop sharply and may even approach zero. This will remove the voltage difference across resistors 114 and 116, thus removing the normal bias applied to the base of transistor 112. In the absence of any other connections transistor 112 would continue to conduct collector-emitter current, although to a limited degree, and this current would, for the reasons set forth above, cause the passing transistor 66 to permit only a certain amount of current to pass therethrough, thus giving rise to a current limiting characteristic. The function of resistors 128 and 130 is to provide an appropriate bias to the base of transistor 112 of a magnitude such that, when the normal bias applied thereto by resistors 114 and 116 has disappeared, or substantially so, because of a high overload or short circuit condition, the collector-emitter current of transistor 112 will nevertheless be quite high, greater than that which the bias normally applied by resistor 114 and 116 would produce. This will cause the passing transistor 66 to permit an even smaller amount of current to pass therethrough than would normally be the case. The relative values of resistors 128 and 130 will, in conjunction with the appropriate voltage outputs from the bias supply 42, determine the extent to which this fold-back will be accomplished, that is to say, will determine the location of the point 32 in FIG. 1 along the current scale.

If the power supply illustrated in FIG. 3 is connected in series with a second power supply, in the manner shown in FIG. 2, and if that second power supply reaches its full output before the first power supply, that second power supply will apply a reverse voltage across the terminals 58 and 60 of the first power supply. This reverse voltage will destroy, wholly or partially, the bias normally provided by resistors 114 and 116 for the base of fold-back transistor 112 in the first system, the fold-back bias of that first system derived from resistors 128 and 130 will take control, and the current output of the first power supply will remain "locked out" at point 32 in FIG. 1.

In order to eliminate this effect, and in accordance with the novel aspects of the disclosure, I provide a pulse-forming circuit generally designated 136. It comprises a unijunction transistor 138 the base 140 and 142 of which are connected by resistors 144 and 146 respectively to leads 148 and 150 respectively, the latter being connected to the reference and positive outputs 44 and 46 respectively o fthe bias supply 42. The other terminal 152 of the unijunction transistor 138 is connected to point 154 between resistor 156 and capacitor 158, the latter being connected in series across the leads 148 and 150. The base 140 of unijunction transistor 138 is connected by resistor 160 and lead 162 to the base of transistor 164, a resistor 166 being connected between lead 148 and base 162, the lead 148 also being connected to the emitter of the transistor 164. The collector of transistor 164 is connected by resistor 168 to lead 150 and by resistor 170 to the base of transistor 172, that base being connected by resistor 174 to lead 150, the lead 150 also being connected to the emitter of transistor 172. The collector of transistor 172 is connected by resistor 176 and lead 178 to point 180 between the resistors 128 and 130. In addition, a reverse biased diode 182 is connected across the output terminals 58 and 60.

The function of the reverse biased diode 182 is to limit the reverse voltage that can appear across the output terminals 58 and 60 to some predetermined value such as 0.75–1 volt. Unijunction transitor 138 functions as a relaxation oscillator whose repetition rate is fixed in time by the relative values of resistor 156 and capacitor 158. This oscillator produces a positive pulse across resistor 144 which is delivered to the base of transistor 164, that transistor 164 in turn producing a negative pulse at its collector. That negative pulse is delivered to the base of transistor 172, thus giving rise to a positive pulse of current at the collector of transistor 172, which pulse flows through resistors 176 and 130 to the base of the fold-back transistor 112. When the positive pulse is received at the base of transistor 112, that transistor is turned off or partially off, depending upon the magnitude of that pulse. When the fold-back transistor 112 is turned off, or to the extent that it is turned off, it fails to shunt current from the base-emitter circuit of the pasisng transistor 66, and that passing transistor 66 passes more current therethrough, thus destroying or minimizing the fold-back characteristic. The fold-back characteristic is thus destroyed or minimized only for so long as the positive signal pulse persists for a period of time long enough to permit the regulated power supply to reach its full output, the potential "locking out" effect of a reverse voltage applied across the output terminals 58 and 60 is seen to be eliminated. Thus if the positive signal pulse is applied to the base of fold-back transistor 112 while reverse voltage is applied across the terminals 58 and 60 (as if the other power supply connected in series therewith comes up to full output first), the power supply in question would still be permitted to build up to full output. When the positive pulse disappears from the base of fold-back transistor 112 the "locking out" reverse voltage will no longer be effective, since the voltage output of the power supply under discussion has now reached its full output. Consequently both power supplies will thereafter function effectively in series, even though one has turned on somewhat before the other.

During operation of the power supply within normal load ranges, the base of the transistor 112 is in any event biased so as to have that transistor substantially in an off condition insofar as base control is concerned, and hence the signal pulses reaching the base of transistor 112 are ineffective.

If a fold-back condition arises (e.g., output short circuit) the fold-back transistor 112 will be turned on by the base bias applied through resistors 128 and 130. The signal pulses derived from the circuit 136 will periodically turn the fold-back transistor 112 off or partially so, thus tending to periodically destroy or minimize its fold-back function for limited periods of time. The fold-back is therefore cyclically interrupted at a slow rate, depending upon the cyclic rate of production of the signal pulses. As a result short pulses of output current are produced, but that current returns to fold-back value (e.g. point 32 on the graph in FIG. 1) after the signal pulse disappears from the base of fold-back transistor 112.

By control of the repetition rate of these pulses, and by control of the magnitude of these pulses, one can control and vary the average dissipation during the output current pulses, keeping it at an acceptably low value.

Figure 4:
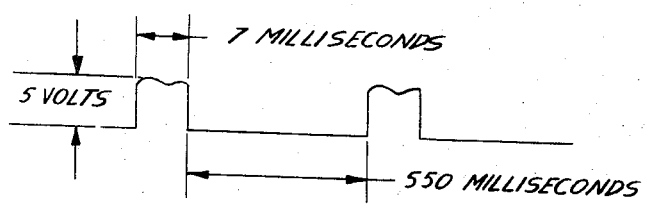
FIG. 4 is a graphical representation of the fold-back inhibiting signal produced by the circuitry of FIG. 3.

I have found that, as illustrated in FIG. 4, square-sided signal pulses having a duration of 7 milliseconds, separated by non-signal intervals of 550 milliseconds, the signals having a maximum amplitude of 5 volts, are exceptionally effective in permitting a very high degree of fold-back (a current value at point 32 which is approximately ten percent of the current value at point 4 in the graph of FIG. 1) and a minimal dissipation within the circuitry during operation under fold-back conditions, while simultaneously providing ample time to permit the power supply to come up to rated output during the signal pulse intervals where that is necessary, as during turn-on. The precise time relationship in question is not critical, but it is preferred that the duration of the signal pulses be substantially no greater than the duration of the intervening periods of non-signal, and best results are obtained if the duration of the signals are less by several orders of magnitude than the duration of the intervening periods of non-signal.

Purely by way of example, the following circuit values obtain in a typical system of the type illustrated in FIG. 3:

| | |
|---|---|
| Resistor 62 | Varies with desired operating conditions. May be chosen to produce 0.5 bias at rated output. |
| Resistor 64 | Used in paralleling passing stages for higher current power supplies. |
| Transistor 68 | 2N442. |
| Transistor 70 | 2N669. |
| Capacitor 72 | Varies with voltage and current. |
| Transistor 76 | 2N398B. |
| Resistors 78, 84, 86, 88, 90, 94 | Vary with voltage of supply. |
| Diode 96 | 1N751. |
| Transistor 112 | PNP silicon. |
| Resistor 114 | 560 ohms. |
| Resistor 116 | Varies depending on desired rated output voltage. |
| Capacitor 124 | .047 mfd. |
| Resistor 128 | 4.7K ohms. |
| Resistor 130 | 3.6K ohms. |
| Transistor 138 | 2N2646. |
| Resistor 144 | 100 ohms. |
| Resistor 146 | 338 ohms. |
| Resistor 156 | 33K ohms. |
| Capacitor 158 | 25 microfarads. |
| Resistor 160 | 100 ohms. |
| Resistor 166 | 100 ohms. |
| Resistor 168 | 1K ohms. |
| Resistor 170 | 300 ohms. |
| Resistor 174 | 220 ohms. |
| Resistor 176 | 2.2K ohms. |
| Diode 182 | Varies depending on supply current. |

Through the use of simple and reliable circuitry comprising that generally designated 136 in FIG. 3, together with the resistor 176 and lead 178, a regulating system having a fold-back characteristic has been so modified as to prevent it from being "locked out" when a reverse voltage is applied thereto, while at the same time it retains its effective regulating and fold-back characteristics.

While but a single embodiment of the present invention has been here disclosed, utilizing particular transistor circuitry, it will be apparent that the invention is not limited thereto, whether as to details, types of transistors, or even the use of transistors at all, and that many variations may be made therein, all within the scope of the invention as defined in the following claims.

I claim:

1. In a regulating system, means for limiting the current passing through said system under normal conditions of operation, fold-back means for reducing the current passing through said system below a predetermined value when the system enters an extreme overload condition, means for continuously producing a series of signals separated by intervening periods of non-signal, and means for continuously connecting said signals to said limiting and fold-back means, said signals having a magnitude such, when applied to said fold-back means, as to render the latter at least partially ineffective, the duration of said signals being at least equal to the length of time required for the regulating system to become substantially effective after being operatively energized.

2. In a regulating system, means for limiting the current passing through said system under normal conditions of operation, fold-back means for reducing the current passing through said system below a predetermined value when the system enters an extreme overload condition, means for continuously producing a series of signals separated by intervening period of non-signal, and means for continuously connecting said signals to said limiting and fold-back means, said signals having a magnitude such, when applied to said fold-back means, as to render the latter at least partially ineffective, the relationship between the duration of said signals and the duration of said intervening periods of non-signal being on the order of 7:550, the duration of said signals being at least equal to the length of time required for the regulating system to become substantially effective after being operatively energized.

3. In a regulating system, means for limiting the current passing through said system under normal conditions of operation, fold-back means for reducing the current passing through said system below a predetermined value when the system enters an extreme overload condition, said limiting means and said fold-back means comprising a transistor having an output operatively connected to said system and an input operatively connected to first and second biasing means for said limiting and fold-back purposes respectively, said first biasing means being effective under said normal conditions of system operation to cause said transistor to be actuated so that its output causes said system to prevent the current passing therethrough from exceeding a predetermined value, said second biasing means being effective, on overload conditions, to cause said transistor to be actuated so that its output causes said system to reduce the current passing therethrough below said predetermined value, means for continuously producing a series of signals separated by intervening periods of non-signal, and means for continuously connecting said signals to the input of said transistor in opposition to said biasing means, said signals having a magnitude such as to overcome said biasing means and thereby render said transistor at least partially ineffective to reduce the current passing through said system, the duration of said signals being at least equal to the length of time required for the regulating system to become substantially effective after being operatively energized.

4. The regulating system of claim 3, in which the duration of said signals is substantially no greater than the duration of said intervening periods of non-signal.

5. The regulating system of claim 3, in which the duration of said signals is less by several orders of magnitude than the duration of said intervening periods of non-signal.

6. The regulating system of claim 3, in which the time relationship between the duration of said signals and the duration of said intervening periods of non-signal is on the order of 7:550.

7. The regulating system of claim 3, in which said signals have essentially abrupt beginnings and ends and have a duration of about 7 milliseconds, said intervening periods of non-signal having a duration of 550 milliseconds.

References Cited
UNITED STATES PATENTS

| | | | |
|---|---|---|---|
| 3,213,350 | 10/1965 | Armour | 307—88.5 |
| 3,229,164 | 1/1966 | McCartney | 317—33 X |
| 3,240,997 | 3/1966 | Burgi et al. | 323—9 X |
| 3,283,238 | 11/1966 | Huge et al. | 323—9 |

JOHN F. COUCH, *Primary Examiner.*

A. D. PELLINEN, *Assistant Examiner.*